United States Patent
Tanaka

(10) Patent No.: US 7,841,723 B2
(45) Date of Patent: Nov. 30, 2010

(54) PROJECTOR USING LAMP, METHOD AND PROGRAM FOR CONTROLLING DISCHARGE LAMP LIGHT SOURCE

(75) Inventor: Akira Tanaka, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 856 days.

(21) Appl. No.: 11/726,133

(22) Filed: Mar. 21, 2007

(65) Prior Publication Data

US 2007/0229777 A1    Oct. 4, 2007

(30) Foreign Application Priority Data

Mar. 29, 2006   (JP)   ............... 2006-091291

(51) Int. Cl.
G03B 21/14    (2006.01)
G02B 27/14    (2006.01)

(52) U.S. Cl. .......................... 353/84; 359/634

(58) Field of Classification Search .................. 353/31, 353/84, 122, 7, 30, 79, 85, 94, 101; 315/224, 315/274, 287, 291; 250/205, 216, 226, 227.18, 250/208.1; 359/443, 462, 634, 892
See application file for complete search history.

(56) References Cited

U.S. PATENT DOCUMENTS

| | | | |
|---|---|---|---|
| 4,384,769 A * | 5/1983 | Brei et al. | ....................... 353/31 |
| 5,608,294 A | 3/1997 | Derra et al. | |
| 6,803,894 B1 | 10/2004 | Hirota et al. | |
| 6,984,040 B2 | 1/2006 | Childers | |
| 2006/0012758 A1 | 1/2006 | Fukano | |
| 2006/0050246 A1 | 3/2006 | Moench et al. | |
| 2006/0132721 A1 * | 6/2006 | Gerets | .......................... 353/84 |

FOREIGN PATENT DOCUMENTS

| | | |
|---|---|---|
| JP | 08-505031 T | 5/1996 |
| JP | 11-133506 A | 5/1999 |
| JP | 11-239359 A | 8/1999 |
| JP | 2003-077689 A | 3/2003 |
| JP | 2003-162001 A | 6/2003 |

(Continued)

OTHER PUBLICATIONS

Notification Concerning Transmittal of International Search Report and Written Opinion of the International Searching Authority, Dated Aug. 6, 2007, for PCT/JP2007/056119, 11 sheets.

(Continued)

Primary Examiner—Georgia Y Epps
Assistant Examiner—Don Williams
(74) Attorney, Agent, or Firm—Holtz, Holtz, Goodman & Chick, PC

(57) ABSTRACT

A projector comprises an alternating-current-drive lamp, a rotating color wheel which includes color segments for transmitting color lights and is disposed in an optical path from the lamp, the color segments including a transparent segment, a projection unit configured to form an optical image by the color lights transmitted through the color wheel, and a light source control unit configured to raise a drive frequency of the lamp in a period in which the transparent segment of the color wheel is present in the optical path from the lamp.

9 Claims, 5 Drawing Sheets

FOREIGN PATENT DOCUMENTS

| | | |
|---|---|---|
| JP | 2003-169346 A | 6/2003 |
| JP | 2004-526992 T | 9/2004 |
| JP | 2005-038815 A | 2/2005 |
| TW | 515208 B | 12/2002 |
| TW | 571151 B | 1/2004 |
| TW | 242990 B | 11/2005 |
| WO | WO 95/35645 A1 | 12/1995 |

OTHER PUBLICATIONS

Japanese Office Action dated Jun. 8, 2010 and English translation thereof, issued in counterpart Japanese Application No. 2006-091291.

Taiwanese Office Action dated Jul. 27, 2010 and English translation thereof in counterpart Taiwanese Application No. 096110441.

* cited by examiner

|  | DRIVE SIGNAL A | DRIVE SIGNAL B | DRIVE SIGNAL C | DRIVE SIGNAL D |
|---|---|---|---|---|
| INPUT VIDEO (PAL) | 50Hz | 50Hz | 50Hz | 50Hz |
| INPUT VIDEO (NTSC/PC) | 60Hz | 60Hz | 60Hz | 60Hz |
| COLOR WHEEL ROTATION FREQUENCY | DOUBLE SPEED | DOUBLE SPEED | DOUBLE SPEED | DOUBLE SPEED |
| IN PAL | 100Hz | 100Hz | 100Hz | 100Hz |
| IN NTSC/PC | 120Hz | 120Hz | 120Hz | 120Hz |
| LAMP CONTROL FREQUENCY (IN PAL) | 50Hz | 100Hz | 150Hz | 200Hz |
| LAMP CONTROL FREQUENCY (IN NTSC/PC) | 60Hz | 120Hz | 180Hz | 240Hz |

FIG.2
(PRIOR ART)

PROJECTOR USING LAMP, METHOD AND PROGRAM FOR CONTROLLING DISCHARGE LAMP LIGHT SOURCE

CROSS-REFERENCE TO RELATED APPLICATIONS

This application is based upon and claims the benefit of priority from prior Japanese Patent Application No. 2006-091291, filed Mar. 29, 2006, the entire contents of which are incorporated herein by reference.

BACKGROUND OF THE INVENTION

1. Field of the Invention

The present invention relates to a projector using a lamp, such as a high-voltage mercury-vapor lamp, to be lit by alternating-current drive, and relates to a light source control method and a program for drive-controlling a lamp to be a light source of the projector.

2. Description of the Related Art

A large number of projectors generally use discharge lamps, such as high-voltage mercury lights, as light sources.

FIG. 1A to FIG. 1F are timing charts respectively illustrating drive of alternating-current-driven discharge lamps in projectors of digital light processing (DLP, registered trade mark) system. FIG. 1A illustrates timing at which each color segment of a color wheel disposed in an optical path downstream of the discharge lamp are inserted into the optical path. Here, on the color wheel, a total of four segments, which are a W filter (white, (transparent or without filter)) to enhance brightness of an image to be projected, in addition to an R (red) filter, a G (green) filter, and a B (blue) filter of three primitive colors, are division-disposed in a circle shape. The rotation of the color wheel sequentially inserts each segment into the optical path in order of R, G, W, and B in a time divisional manner.

FIG. 1B to FIG. 1E respectively exemplify drive signals A to D by rectangular waveforms in each drive condition shown in FIG. 2. In each FIGS. 1B to 1E, for example, if its drive signal level is high, a ballast of a light source lamp generates a discharge from one of two oppositely disposed electrodes of the discharge lamp to the other electrode of the discharge lamp, or if its drive signal level is low, the ballast generates a discharge from the other electrode to the one electrode, respectively.

Here, in the projector of the aforementioned DLP system has a restriction that the signal for the drive signal has to be input in synchronization with the rotation period of the color wheel.

FIG. 1F exemplifies a drive signal E that is departed from the restriction, and depicts a status in which the high and low levels are switched on the way in which the segment of the B filter on the color wheel is present on the optical path. When the discharge lamp is driven by the drive signal at such timing, as a matter of course, the projector cannot accurately project an image corresponding to an input signal.

On the other hand, there is a temperature condition for an excellent operation of the high-voltage mercury-vapor lamp, and optimizing the frequency of the alternating-current-drive achieves an appropriate temperature condition. The appropriate temperature condition assures a light-emitting efficiency and a service life, and suppresses the occurrence of flicker of the mercury-vapor lamp.

As to one technique therefore, WO 95/35645 discloses a technique, in which a current pulse is generated in a predetermined fraction of the half periods of the lamp current in order to suppress the flicker of the alternating-current-driven discharge lamp, and the current pulse has the same polarity as the lamp current and is superimposed on the lamp current in the latter part of the half period in which it is generated.

The control for the alternating-current-driven discharge lamp in the projector of the foregoing conventional DLP system has to synchronize with the segments on the color wheel, and has to make reverse the polarities of drive signal waveforms in timing with the switching timing of each segment, so that it results in limitation of the drive frequency to a certain extent.

If the color wheel consists of a total of four segments of R, G, B, and W, as shown in FIG. 2 and the frequency of an input video signal is 60 Hz adopted in an NTSC system that is one of a television system, or adopted in a generic personal computer (PC), the color wheel results in rotation with 120 Hz that is a double frequency. Therefore, the drive frequencies of the drive signals A, B, C, and E respectively shown in FIGS. 1B, 1C, 1D, and 1E become 60 Hz, 120 Hz, 180 Hz, and 240 Hz, respectively, and here, the drive frequency is resulted in the limitation of a value of an integral multiple of 60 Hz and in the limitation of a value not higher than 240 Hz as well.

Further, if the PAL system (50 Hz) that is one of the other television systems is taken into account, the projector has to find out an appropriate frequency to drive the discharge lamp on a limited condition that the frequency should be integral multiple of 50 Hz and not higher than 200 Hz, and it should be integral multiple of 60 Hz and not higher than 240 Hz, then, it is very hard to set a specific and appropriate frequency.

The technique described in the above patent document is one to change the drive waveform of the alternating-current-drive lamp within a period. If the system varying content of an image to be displayed by a micromirror device for tone control in one segment period of the wheel due to the rotation of the color wheel like the projector of the DLP system employs the above technique, it is impossible to conduct accurate tone control.

BRIEF SUMMARY OF THE INVENTION

The present invention is directed to a projector, a method and a program for controlling a light source of the projector which are configured to achieve projection of a stable image.

According to an embodiment of the present invention, a projector comprises:

an alternating-current-drive lamp;

a rotating color wheel which includes color segments for transmitting color lights and is disposed in an optical path from the lamp, the color segments including a transparent segment;

a projection unit configured to form an optical image by the color lights transmitted through the color wheel; and a light source control unit configured to raise a drive frequency of the lamp in a period in which the transparent segment of the color wheel is present in the optical path from the lamp.

According to another embodiment of the present invention, a method for controlling a projector which comprises an alternating-current-drive lamp; a rotating color wheel which includes color segments for transmitting color lights and is disposed in an optical path from the lamp, the color segments including a transparent segment; and a projection unit configured to form an optical image by the color lights transmitted through the color wheel, the method comprises:

raising a drive frequency of the lamp in a period in which the transparent segment of the color wheel is present in the optical path from the lamp.

According to another embodiment of the present invention, a computer program for a projector which comprises an alternating-current-drive lamp; a rotating color wheel which includes color segments for transmitting color lights and is disposed in an optical path from the lamp, the color segments including a transparent segment; and a projection unit configured to form an optical image by the color lights transmitted through the color wheel, and the program comprises:

raising a drive frequency of the lamp in a period in which the transparent segment of the color wheel is present in the optical path from the lamp.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention in which:

FIG. 2 is a view illustrating the frequency condition of the alternating-current-drive lamp;

DETAILED DESCRIPTION OF THE INVENTION

An embodiment of a projector according to the present invention will now be described with reference to the accompanying drawings. Hereinafter, one embodiment in which the present invention is applied to a projector of DLP system will be described.

Figure 3:
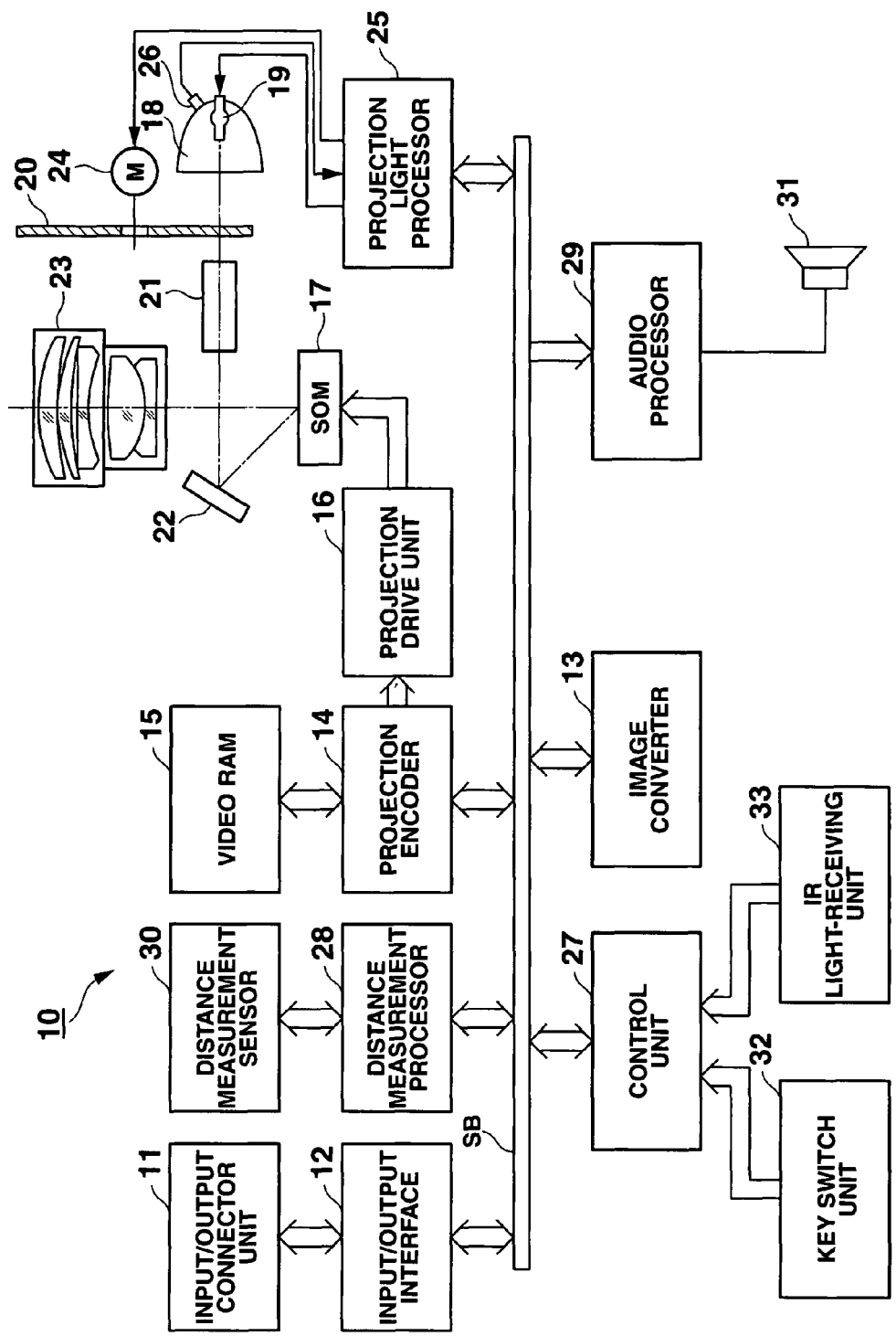
FIG. 3 is a block circuit diagram illustrating a schematic configuration of a projector according to an embodiment of the invention.

FIG. 3 explains a circuit configuration of a projector 10 according to the embodiment. FIG. 3 shows a schematic configuration of a functional circuit and also includes components different from a configuration with an actual LSI, IC, etc., mounted thereon.

Various-standard video signals input from an input/output connector unit 11 are converted into a video signal with a prescribed format by a video converter 13 through an input/output interface 12 and a system bus SB, then, sent to a projection encoder 14.

The encoder 14 stores the input video signal into a video RAM 15, and also generates a projection signal from the storage content in the video RAM 15 to output it to a projection drive unit 16.

The drive unit 16 drives, for instance, a micromirror device 17 that is a spatial optical modulation (SOM) element in a further high-rate time divisional drive by which appropriate frame rate, for example, 60 frames/sec in an NTSC/PC system is multiplied by the number of division and the number of display tones of color components in response to the projection signal.

After coloring a white light, having high brightness emitted from an alternating-current-driven light source lamp 19 which is disposed in a reflector 18 and using, for instance, extra-high-voltage mercury-vapor lamp, with an appropriate primitive color via a color wheel 20 to generate a light flux having a rectangular cross-section and a uniform brightness distribution through a light tunnel 21, an optical image is formed by the reflected light by totally reflecting the light flux on a mirror 22 to irradiating it, and the optical image is projected on a screen (not shown here) through a projection lens 23.

The lighting drive of the light source lamp 19 and also the rotation drive of the color wheel 20 by a motor (M) operate on the basis of the applied voltage value from a projection light processor 25.

In addition, a temperature sensor 26 is disposed near by the light source lamp 19 of the reflector 18 to keep detecting the temperature of the light source lamp 19, and the temperature detection signal of the light source lamp 19 obtained by the temperature sensor 26 is input to the projection light processor 25 as well.

A control unit 27 conducts the whole of the operation control of each circuit given above. The control unit 27 is composed of a CPU, a nonvolatile memory with an operation program executed by the CPU in projection-operating and every type of data, etc., fixedly stored therein, and a work memory, or the like.

The control unit 27 is connected to a distance measurement processor 28 and an audio processor 29 via the system bus SB as well.

The distance measurement processor 28 controls a distance measurement sensor 30 consisting of two pairs of phase difference sensors to calculate the distance up to an arbitrary point position from the detection outputs from the measurement sensor 30, and supplies the calculated distance value data to the control unit 27.

The audio processor 29 has an audio circuit, such as a PCM sound source, analog-converts the audio data supplied in projection-operating to drive a loudspeaker 31, amplifies to emit the audio data, or generates a beep sound, etc., if necessary.

Each key operation signal at a key switch unit 32 is directly input to the control unit 27, and a signal from an Ir light-receiving unit 33 is directly input to the control unit 27 as well.

The key switch unit 32 is composed of, for instance, a power key, an automatic focus/automatic keystone correction (AFK) key, a zoom key, an input selection key, cursor ("↑", "↓", "←", "→") keys, an "Enter" key, and the like, the similar keys are also arranged at a remote controller (not shown) of the projector 10.

The light-receiving unit 33 includes each Ir light-receiving element disposed on the front face and the rear face of the projector 10, and converts an infrared light receiving signal from the remote controller of the projector 10 into a code signal to send out it to the control unit 27.

Next, operations of the embodiment will be described.

Figure 1:
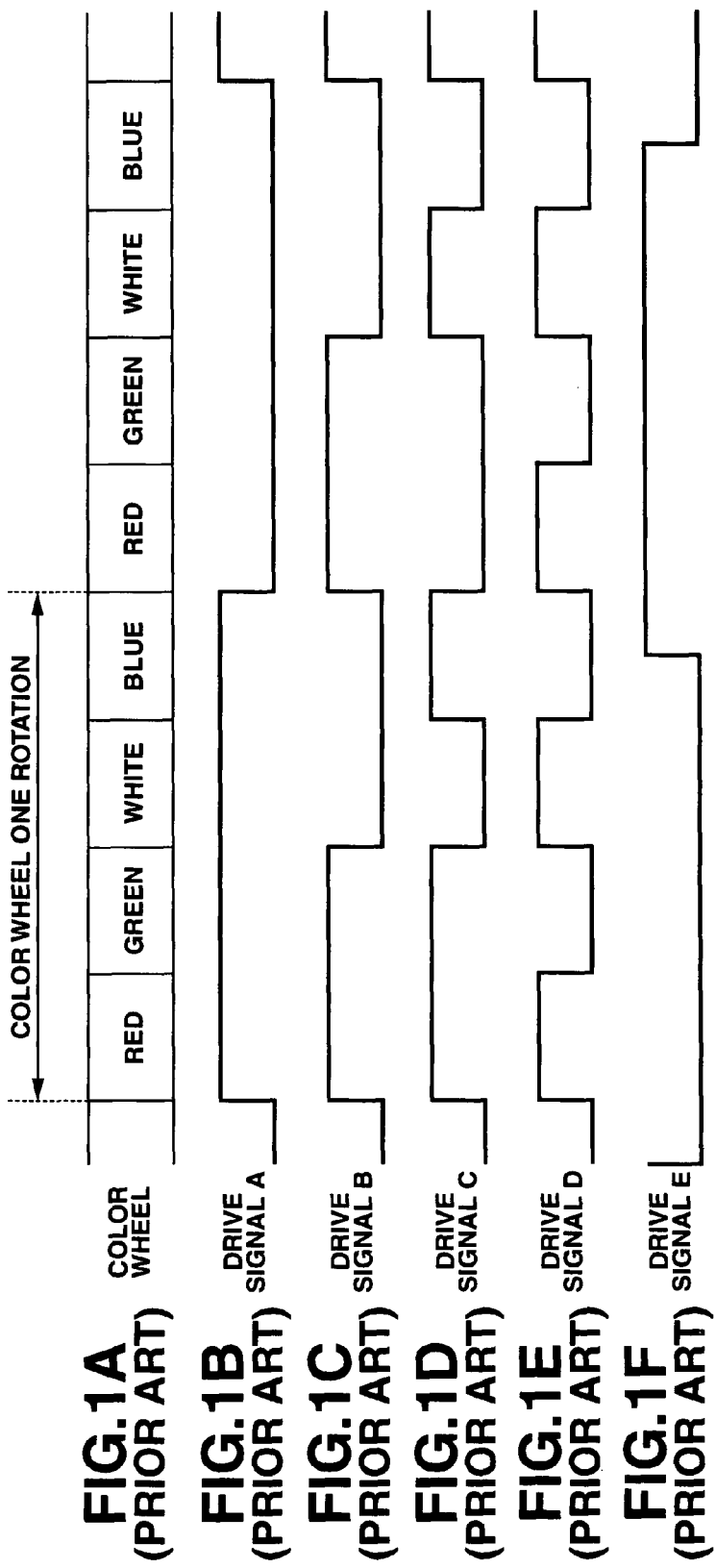
FIGS. 1A, 1B, 1C, 1D, 1E, and 1F are views exemplifying drive signal waveforms of an alternating-current-drive lamp to be a light source of a projector in a generic DLP system.
Figure 4:
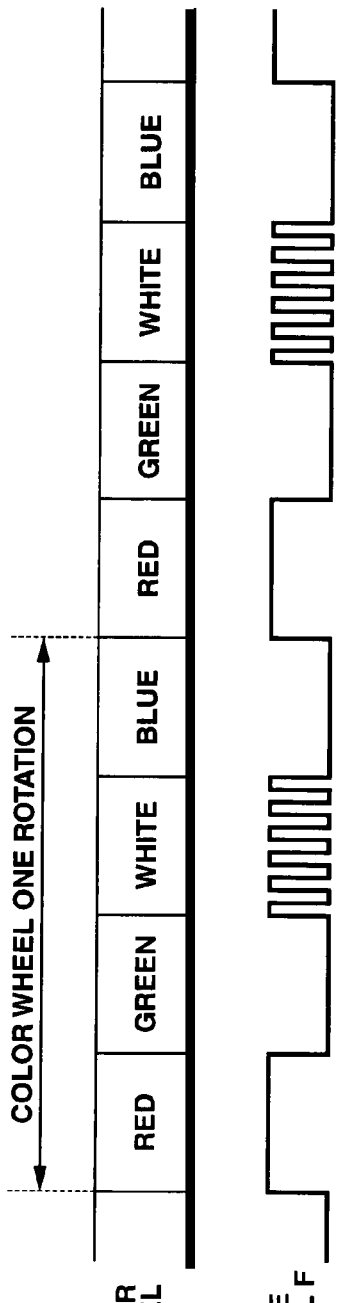
FIGS. 4A and 4B are views illustrating drive signal waveforms of the alternating-current-driven light source lamp according to the embodiment of the invention.

FIG. 4A illustrates the rotation period of the color wheel 20. As a similar manner shown in FIG. 1A, in addition to each segment of an R (red), a G (green), and a B (blue) for three primitive colors, a W (white, (transparent or without filter)) segment to enhance brightness of an image to be projected are division-disposed in a circle between the G and B segments on the color wheel. A total of four segments are then circularly inserted in order of R, G, W, and B in the optical path from the light source lamp 19 by the rotation drive of the motor 24.

FIG. 4B shows a drive signal waveform F of a current value in the case where the projection light processor 25 alternating-current-drives the light source lamp 19 in synchronization with the rotation of the color wheel 20.

As shown in FIG. 4B, the projector 10 supplies a high frequency signal to the light source lamp 19 only in the period corresponding to the segment of W to generate a plurality of times of discharges between a pair of electrodes consisting of the light source lamp 19, while projecting the images of each primitive color which are tone-controlled at the high level in a period corresponding to the segment of R, and at the low level in a period corresponding to each segment of G and B. Depending on the tone, the drive signal F is set to the high level in a period corresponding to the segment of G or B.

At this moment, the control unit 27 displays the video signal binarized on the basis of a brightness signal Y on the micromirror device 17 by the projection drive unit 16, and this high-frequency drive makes the projection lens 23 successively project the binarized image of the brightness signal with the identical content onto a screen in plural times.

By conducting such an operation, the projector 10 accelerates a halogenation cycle at the extra-high-voltage mercury light constituting the light source lamp 19 by raising the drive frequency in amount without causing deterioration in quality of a projected image, keeps the electrode temperature of the light source lamp 19 within an appropriate range to restrict the occurrence of flickers as much as possible.

During the projection period corresponding to the segment of W, the micromirror device 17 displays, for example, an image which turns the whole of the screen into white, then, the projector 10 makes it possible to also project a brighter image.

However, such a display results in generation of so-called "imperfect black" by which the part should be originally colored in black in the image is displayed in gray.

Therefore, in this embodiment, the projector 10, as mentioned above, projects the image digitized on the basis of the brightness signal in the period corresponding to the W segment, and can clearly express a bright part and a dark part to reproduce a lively image while suppressing the "imperfect black".

In projecting the digitized image based on the brightness signal, if a user may arbitrarily adjust the threshold for digitizing the brightness signal, the projector 10 can project an image with an image quality in response to a setting environment such as a shading property of a room where the projector 10 is installed, in response to a preference of a user itself, etc.

An implementation of the invention having been described that the projector 10 high-frequency-drives the light source lamp 19 for every period corresponding to the W segments in synchronization with the rotation period of the color wheel 20. However, a case in which the drive with a very-high-frequency is not necessary may be thought depending on the characteristic of the light source lamp 19. Accordingly, for instance, during the multiple rotations of the color wheel 20, namely, only one time among of more than one times of the times corresponding to the W segment, high-frequency-driving the light source lamp 19 during the corresponding time period to raise the electrode temperature of the light source lamp 19, and accelerating the halogenation cycle to maintain the electrode temperature thereof within a fixed range is a possible approach.

It is also acceptable for the projector 10 to make the frequency in high-frequency-driving the light source lamp 19 adjustable within the period corresponding to the W segment.

Controlling not only the drive frequency of the light source lamp 19 but also the drive voltage thereof during the period corresponding to the W segment is also a possible approach. In such a case, the light source being possible to be enhanced by raising the drive voltage in the corresponding period, the projector 10 may further efficiently suppress the occurrence of the flickers.

It is also acceptable to control the drive voltage in stead of controlling the drive frequency.

Figure 5:
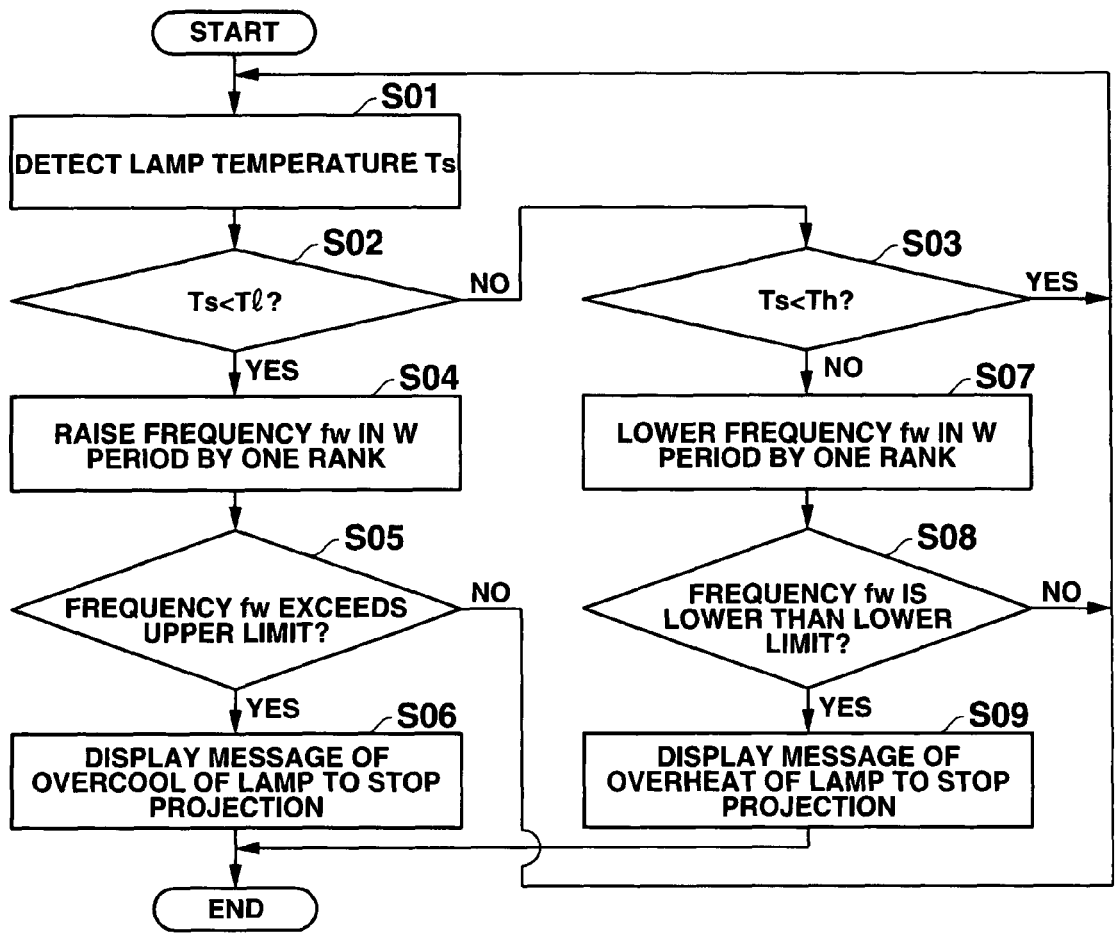
FIG. 5 is a flowchart illustrating a processing for setting a drive frequency at a W (white) segment of the alternating-current-driven light source lamp according to the embodiment of the invention.

FIG. 5 is a flowchart illustrating an operation example when the projector 10 automatically makes its frequency adjustable. It is presumed that the control unit 27 executes the control operation thorough the projection light processor 25.

In this description, the temperature of the light source lamp 19 detected by the temperature sensor 26 is expressed by Ts (variable), the lower limit value of the temperature range of the light source lamp 19 within which the halogenation cycle is appropriately took place is expressed by Tl (fixed value), the upper limit value of the temperature range of the light source lamp 19 within which the halogenation cycle is appropriately took place is expressed by Th (fixed value), and the drive frequency of the light source lamp 19 within the period corresponding to the W segment at that time is expressed by fw.

In step S01, the temperature sensor 26 detects the temperature Ts of the light source lamp 19. In step S02, it is determined whether or not the detected temperature Ts is lower than the lower limit value Tl. If the temperature Ts is not lower than the lower limit value Tl, it is determined in step S03 whether or not the temperature Ts is lower than the upper limit value Th. If the temperature Ts is lower than the upper limit Th, the flow returns to step S01. In other words, the loop processing in steps S01, S02, and S03 recognize that the temperature Ts of the light source lamp 19 does not depart from the range in which the halogenation cycle is appropriately took place.

If it is determined that the detected temperature Ts is lower than the lower limit value Tl in step S02, the projector 10 conducts update setting to raise by one rank the drive frequency fw of the light source lamp 19 in the period corresponding to the W segment set at that time (step S04).

In addition to confirm that the drive frequency after the update setting does not exceed the upper limit value of the drive frequency (step S05), the flow returns to the processing from step S01 again.

By this processing, if it is determined that the temperature of the light source lamp 19 is low, the projector 10 can sequentially raise the drive frequency fw of the light source lamp 19 within the period corresponding to the W segment step by step, and raise the electrode temperature of the light source lamp 19 by further accelerating the halogenation cycle.

If the drive frequency after the update setting exceeds the upper limit value of the preset drive frequency by repeatedly executing the processing in step S04 more than once without raising the electrode temperature of the light source lamp 19 as expected, the light source lamp 19 being brought into a state of over-cool due to a some sort of reason, this situation is determined in step S05. The projector 10 then displays the fact by displaying in, for example, a guide message in the projection image to notify it to a user, and stops the projection operation immediately, and prevents the light source lamp 19 from deteriorating (step S06).

In step S03, if it is determined that the detected temperature Ts is not lower than its upper limit value Th, the projector 10 performs update setting to lower the drive frequency fw of the light source lamp 19 by one rank in the period corresponding to the W segment preset at that time in order to suppress the halogenation cycle (step S07).

In addition to confirming that the drive frequency after the update setting has not being lower than the preset lower limit value (step S08), the flow returns to the processing from step S1 again.

By this processing, if the temperature of the light source lamp 19 is high, the projector 10 can sequentially lower the drive frequency fw of the light source lamp 19 in the period corresponding to the W segment step by step, and lower the electrode temperature of the light source lamp 19 by suppressing the halogenation cycle.

When the drive frequency after the update setting becomes lower than the lower limit value of the preset drive frequency by repeatedly executing the processing in step S07 more than once without lowering the electrode temperature of the light source lamp 19 as expected, the light source lamp 19 has brought into an overheat state due to a some sort of reason, the projector 10 determines this state in step S08. The projector 10 then immediately stops the projection operation to prevent the light source lamp 19 from deteriorating (step S09).

As mentioned above, the projector 10 enables the frequency for alternating-current-driving the light source lamp 19 in the period corresponding to the W segment to automatically change, always executes the stable halogenation cycle to keep the electrode temperature of the light source lamp 19 within a fixed range, and can automatically maintain the state in which the occurrence of the flickers sufficiently suppressed.

The operations described for FIG. 5 have been performed, based on the temperature of the light source lamp 19 detected by the temperature sensor 26. However, a timer for counting the time after the power-on may be provided in, for example, a working area in the inside of the control unit 27 and it may be presumed that the electrode temperature of the light source lamp 19 has not been sufficiently raised during a start-up time period until a fixed time period elapses after power-on, the projector 10 then may actively raise the drive frequency in the period of the W segment of the light source lamp 19 in accordance with the counted value of the timer.

Thereby, the projector 10 can reduce the start-up time period until the light source lamp 19 is sufficiently warmed after the power-on and brought into the stable halogenation cycle, quickly shift to the projection operation with stable image quality, and extent the service life of the light source lamp 19.

If the light source lamp 19 occurs a change in halogenation cycle across the age, by taking that point into account, a timer for counting the accumulated use time of the light source lamp 19 may be provided for, e.g., a nonvolatile memory in, e.g., control unit 27, and the drive frequency in the period of the W segment of the light source lamp 19 may be adjusted in accordance with the counting value.

Thereby, even when the light source lamp 19 has been used for a long while, and the change in the halogenation cycle of the light soured lamp 19 has occurred, the light source lamp 19 can maintain the projection operation for a long time in the status in which the similar cycle is maintained and the occurrence of the flicks is sufficiently suppressed.

An implementation stage having exemplified the case in which the present invention is applied to the projector of the DLP system using the micromirror device as the SOM element to form the optical image in response to the video signal, the present invention is not limited to this example, and the present invention may be similarly applied to the projector using the alternating-current-driven discharge lamp as the light source, even if the projector is one using any one of the SOM element, such as a transparent liquid crystal display panel, a reflection-type liquid crystal panel including a liquid crystal on silicon (LCOS), and a GXL (registered trade mark) using a grating light value (GLV) technique.

The present invention is not limited to the specific details and representative embodiments shown and described herein, and in an implementation phase, the present invention may be embodied in various forms without departing form the spirit or scope of the general inventive concept thereof. The functions executed in the foregoing embodiments may be implemented by appropriately combining the functions as much as possible. The aforementioned embodiments include a variety of implementation phases, a variety of inventions may be extracted from the appropriate combinations depending on a plurality of constituent elements disclosed in the embodiments given above. If any effect can be obtained from a configuration, even when some of the elements, for example, may be omitted from the whole of the constituent elements shown in the foregoing embodiments, the configuration, from which the constituent elements omitted, may be extracted as the invention.

What is claimed is:

1. A projector comprising:
   an alternating-current-drive lamp configured to emit a white light;
   a rotating color wheel which is disposed in an optical path from the lamp and which includes color segments and a transparent segment, the color segments coloring the white light emitted from the lamp to produce color lights, and the transparent segment transmitting the white light;
   a projection unit configured to form an optical image by the color lights and the white light which are transmitted through the color wheel; and
   a light source control unit configured to raise a drive frequency of the lamp in a period in which the transparent segment of the color wheel is present in the optical path from the lamp.

2. The projector according to claim 1, wherein the projection unit projects a binarized image based on a brightness signal in the period in which the transparent segment of the color wheel is present in the optical path from the lamp.

3. The projector according to claim 1, wherein the light source control unit gradually raises or lowers a drive frequency of the lamp in the period in which the transparent segment of the color wheel is present in the optical path from the lamp.

4. The projector according to claim 3, further comprising a temperature detector configured to detect a temperature of the lamp, and wherein the light source control unit gradually raises or lowers the drive frequency of the lamp in accordance with a detection result of the detector.

5. The projector according to claim 3, further comprising a timer configured to count a time after power-on, and wherein the light source control unit gradually raises or lowers the drive frequency of the lamp in accordance with a time counted by the timer.

6. The projector according to claim 3, further comprising a timer to count a use time of the lamp, and wherein the light source control unit gradually raises or lowers the drive frequency of the lamp in accordance with a time counted by the timer.

7. The projector according to claim 1, wherein the light source control unit further controls a drive voltage of the lamp in the period in which the transparent segment of the color wheel is present in the optical path from the lamp.

8. A method for controlling a projector which comprises: (i) an alternating-current-drive lamp configured to emit a white light; (ii) a rotating color wheel which is disposed in an optical path from the lamp and which includes color segments and a transparent segment, the color segments coloring the white light emitted from the lamp to produce color lights, and the transparent segment transmitting the white light; and (iii) a projection unit configured to form an optical image by the color lights and the white light which are transmitted through the color wheel, the method comprising:

raising a drive frequency of the lamp in a period in which the transparent segment of the color wheel is present in the optical path from the lamp.

9. A non-transitory computer readable storage medium having stored thereon a computer program for a projector, the projector comprising: (i) an alternating-current-drive lamp configured to emit a white light; a rotating color wheel which is disposed in an optical path from the lamp and which includes color segments and a transparent segment, the color segments coloring the white light emitted from the lamp to produce color lights, and the transparent segment transmitting the white light ; and (iii) a projection unit configured to form an optical image by the color lights and the white light which are transmitted through the color wheel, wherein the program controls the projector to perform functions comprising:

raising a drive frequency of the lamp in a period in which the transparent segment of the color wheel is present in the optical path from the lamp.

\* \* \* \* \*